US009350284B2

(12) United States Patent
Sakai et al.

(10) Patent No.: US 9,350,284 B2
(45) Date of Patent: May 24, 2016

(54) POWER CONVERSION DEVICE

(71) Applicant: Hitachi, Ltd., Chiyoda-ku, Tokyo (JP)

(72) Inventors: Toshifumi Sakai, Tokyo (JP); Koichiro Nagata, Tokyo (JP); Yoshitaka Iwaji, Tokyo (JP); Motomi Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 183 days.

(21) Appl. No.: 14/355,452

(22) PCT Filed: Oct. 22, 2012

(86) PCT No.: PCT/JP2012/077226
§ 371 (c)(1),
(2) Date: Jul. 10, 2014

(87) PCT Pub. No.: WO2013/065512
PCT Pub. Date: May 10, 2013

(65) Prior Publication Data
US 2014/0340005 A1    Nov. 20, 2014

(30) Foreign Application Priority Data
Nov. 1, 2011  (JP) .............................. 2011-240255

(51) Int. Cl.
| H02M 7/00 | (2006.01) |
| H02P 27/08 | (2006.01) |
| H02P 23/04 | (2006.01) |
| H02P 21/05 | (2006.01) |
| H02P 23/00 | (2016.01) |
| H02P 27/06 | (2006.01) |
| H02P 9/10 | (2006.01) |

(52) U.S. Cl.
CPC ................ *H02P 23/04* (2013.01); *H02P 9/102* (2013.01); *H02P 21/05* (2013.01); *H02P 23/0095* (2013.01); *H02P 27/06* (2013.01)

(58) Field of Classification Search
CPC ....... H02P 27/06; H02P 27/085; H02P 6/002; H02P 21/0035; H02P 21/00; H02P 27/08; H02P 6/08; H02P 21/0039; H02P 21/0096; H02P 23/0095; H02P 29/0038; H02P 6/10; H02M 7/00
USPC .......................................... 318/139, 151–154
See application file for complete search history.

(56) References Cited

U.S. PATENT DOCUMENTS 4,060,753 A * 11/1977 Okuyama ............. H02P 25/023
318/400.08
5,231,344 A *  7/1993 Marumoto ............ H02J 7/1446
322/14

(Continued)

FOREIGN PATENT DOCUMENTS

JP    2002-204596 A    7/2002
JP    2007-252142 A    9/2007

(Continued)

OTHER PUBLICATIONS

International Search Report (PCT/ISA/210) with English translation dated Jan. 22, 2013 (Four (4) pages).

*Primary Examiner* — Bentsu Ro
(74) *Attorney, Agent, or Firm* — Crowell & Moring LLP

(57) ABSTRACT

In a system for driving an electric motor by an engine generator, there is a possibility that oscillation and d-axis current are increased. In an engine generator system, a power converter (105) controls a generator (104) so that the phase of an oscillating component included in the d-axis current in the rotor magnetic flux direction of the generator (104) advances by 90 degrees or more with respect to the phase of an oscillating component of the identical frequency included in the rotating electric angular frequency of the generator (104), and further using q-axis voltage adjusting device (118) so that the phase of an oscillating component included in the q-axis current advances by 90 degrees or more with respect to the phase of an oscillating component of the identical frequency included in the rotating electric angular frequency of the generator (104).

6 Claims, 13 Drawing Sheets

(56) References Cited

U.S. PATENT DOCUMENTS 5,376,872 A * 12/1994 Hara .................. H02M 7/5395
318/799
8,362,734 B2 * 1/2013 Arisawa .................. H02P 8/22
318/611

2002/0089310 A1 7/2002 Shimizu et al.

FOREIGN PATENT DOCUMENTS

| | | |
|---|---|---|
| JP | 2009-303435 A | 12/2009 |
| JP | 2010-259275 A | 11/2010 |

* cited by examiner

TORQUE FROM MACHINE

FIG. 8

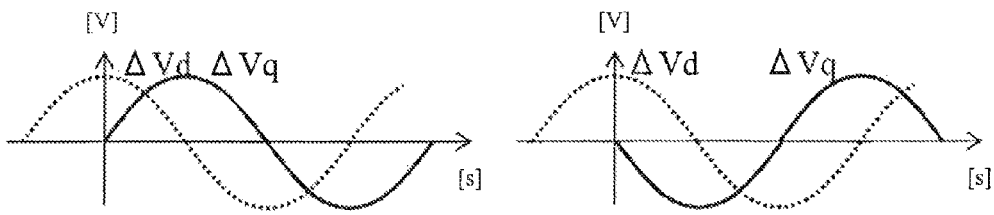

- DISTURBANCE CHARACTERISTICS (1) OF CNV HARMONICS
  VOLTAGE DISTURBANCE $\Delta Vd$: $Edc \times A\cos \omega_0 t$
  VOLTAGE DISTURBANCE $\Delta Vq$: $Edc \times A\sin \omega_0 t$
  [A: COEFFICIENT; $\omega_0$: PULSATION FREQUENCY; Edc: DC VOLTAGE]

- DISTURBANCE CHARACTERISTICS (2) OF CNV HARMONICS
  VOLTAGE DISTURBANCE $\Delta Vd$: $Edc \times A\cos \omega_0 t$
  VOLTAGE DISTURBANCE $\Delta Vq$: $Edc \times A(-\sin \omega_0 t)$
  [A: COEFFICIENT; $\omega_0$: PULSATION FREQUENCY; Edc: DC VOLTAGE]

FIG. 9

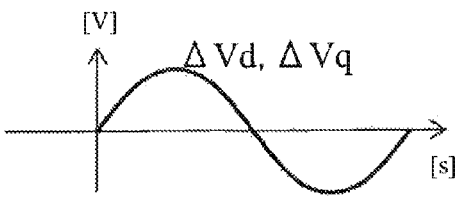

- DISTURBANCE CHARACTERISTICS OF DC VOLTAGE PULSATION
  VOLTAGE DISTURBANCE $\Delta Vd$: $Vd^* \times A\sin \omega_0 t$
  VOLTAGE DISTURBANCE $\Delta Vq$: $Vq^* \times A\sin \omega_0 t$
  [A: COEFFICIENT; $\omega_0$: PULSATION FREQUENCY; $Vd^*$: D-AXIS VOLTAGE COMMAND; $Vq^*$: Q-AXIS VOLTAGE COMMAND]

POWER CONVERSION DEVICE

TECHNICAL FIELD

The present invention relates to a power conversion device for an engine generator system and an electric motor driving system, and particularly to a power conversion device that achieves control of suitably suppressing the oscillation of a shaft between a generator and an engine or of a shaft of a rotating apparatus connected to an electric motor.

BACKGROUND ART

In an electric motor driving system in which an electric motor is driven at a variable speed by a power converter to operate a rotating apparatus such as a fan, a pump and a compressor through a reduction gear, an acceleration gear and the like, an oscillating component having a specific frequency can appear at a shaft between the electric motor and the rotating apparatus. Such a frequency for oscillation is unique to the apparatus, and power converter driving needs to be controlled so that an oscillation having such an unique frequency does not adversary affect the system.

For this reason, there is a known art for controlling the output frequency of a power converter to shorten (skip) an operating time at a specific frequency in which the oscillation is large. There is also a known art for controlling a power converter to cancel the above-described oscillating component in driving in the neighborhood of a specific frequency, in which the speed fluctuation or torque fluctuation component is estimated so that a reverse torque by the electric motor is applied to cancel the pulsation, as is disclosed for example in Patent Literature 1.

Also, in Patent Literature 2, oscillating components are suppressed by controlling voltage for driving an electric motor so that the phase of an oscillating component included in motor torque or motor torque current generated by the electric motor advances by 90 degrees or more with respect to the phase of an oscillating component of identical frequency included in a rotating electric angular frequency of the electric motor.

CITATION LIST

Patent Literature

Patent Literature 1: Japanese Patent Laid-Open Publication No. 2007-252142
Patent Literature 2: Japanese Patent Laid-Open Publication No. 2010-259275

SUMMARY OF INVENTION

Technical Problem

In Patent Literature 1, pulsation torque of the driving system and load torque from the electric motor are estimated as a disturbance torque based on the rotation speed, and a motor torque is compensated to cancel the disturbance torque. Unfortunately, information on electric motor and mechanical systems is indispensable to estimate speed and torque for shaft oscillation. Thus, it is necessary to obtain these constants beforehand or measure them, and if these values differ from actual values, there is a possibility that torque which conversely facilitates oscillation may arise. When control calculation is complicated and control delay becomes noticeable, there is also a possibility that torque which conversely facilitates oscillation may arise.

In Patent Literature 2, oscillation of a mechanical system is suppressed by controlling a q-axis voltage command so that an oscillating component included in a torque current $Iq$ or a motor torque $\tau G$ is advanced by 90 degrees or more with respect to an oscillating component included in a rotational angular frequency $\omega 1$ of an electric motor. Unfortunately, when the conventional art of Patent Literature 2 is applied to an electric motor driving system run by an engine generator, a phenomenon in which current pulsations due to d-axis and q-axis voltage disturbances are enhanced can occur, leading to an increase in shaft oscillation, depending on the effect of harmonics of the power converter or the effect of DC voltage fluctuations caused by fluctuations in load from the electric motor. Since an oscillation suppressing loop by a current detection value $IqFB$ is provided only for a q-axis voltage command depending on the electrical transfer characteristic of the electric motor, an increase in oscillation influenced by interference between d- and q-axes or an increase in d-axis current can also occur.

In view of the circumstances described above, an object of the present invention is to provide a method of controlling an engine generator system, a power converter, a generator controlling device and a generator, which allows the suppression of oscillating components in an electric motor driving system run by an engine generator.

It is another object of the present invention to provide a power converter with improved constant robustness and a control method for suppressing shaft oscillation because in household appliance, steel and other general industrial applications involving high pressure or drive fields, it is preferred that gain in a control system is easily designed even if the accuracy of each constant for a mechanical system such as a generator, engine and electric motor is relatively low.

Solution to Problem

In order to achieve the above-mentioned objects, according to the present invention, a power conversion device in an engine generator system controls a generator by regulating voltage on a d-axis in the magnetic flux direction of a rotor in the generator so that the phase of an oscillating component included in current of the d-axis in the generator advances 90 degrees or more with respect to the phase of an oscillating component of identical frequency included in a rotating electric angular frequency of the generator, and further by regulating voltage on a q-axis perpendicular to the d-axis so that the phase of an oscillating component included in current of the q-axis advances 90 degrees or more with respect to the phase of an oscillating component of identical frequency included in the rotating electric angular frequency of the generator.

Specifically, the engine generator system includes a generator, an engine for driving the generator, a current detector that detects current flowing through the generator, a PWM signal controller for performing pulse width modulation on a three-phase voltage command signal via a carrier signal, a power conversion device driven by a pulse width modulated gate signal, an electric motor, and a power converter for driving the electric motor. The power conversion device includes a dq-axes voltage adjusting part that controls voltage outputted from the power converter that controls the generator, wherein the dq-axes voltage adjusting part controls the generator by regulating voltage on a d-axis in the magnetic flux direction of a rotor in the generator so that the phase of an oscillating component included in current of the d-axis in the generator advances 90 degrees or more with respect to the phase of an oscillating component of identical frequency included in a rotating electric angular frequency of the generator, and further by regulating voltage on a q-axis perpendicular to the d-axis so that the phase of an oscillating component included in current of the q-axis advances 90 degrees or more with respect to the phase of an oscillating component of identical frequency included in the rotating electric angular frequency of the generator.

Furthermore, according to the present invention, in the power conversion device of the engine generator system, the dq-axes voltage adjusting part includes d-axis voltage adjusting means and q-axis voltage adjusting means. The d-axis voltage adjusting means and the q-axis voltage adjusting means comprise any one of: proportional control; proportional control and first-order lag control; and proportional control, first-order lag control and inexact differential control.

According to the present invention, a power conversion device in an electric motor driving system controls an electric motor by regulating voltage on a d-axis in the magnetic flux direction of a rotor in the electric motor so that the phase of an oscillating component included in current of the d-axis in the electric motor advances 90 degrees or more with respect to the phase of an oscillating component of identical frequency included in a rotating electric angular frequency of the electric motor, and further by regulating voltage on a q-axis perpendicular to the d-axis so that the phase of an oscillating component included in current of the q-axis advances 90 degrees or more with respect to the phase of an oscillating component of identical frequency included in the rotating electric angular frequency of the electric motor.

Specifically, the electric motor driving system includes an electric motor, a current detector that detects current flowing through the electric motor, a PWM signal controller for performing pulse width modulation on a three-phase voltage command signal via a carrier signal, and a power conversion device driven by a pulse width modulated gate signal. The power conversion device includes a dq-axes voltage adjusting part that controls voltage outputted from the power conversion device that controls the electric motor, wherein the dq-axes voltage adjusting part controls the electric motor by regulating voltage on a d-axis in the magnetic flux direction of a rotor in the electric motor so that the phase of an oscillating component included in current of the d-axis in the electric motor advances 90 degrees or more with respect to the phase of an oscillating component of identical frequency included in a rotating electric angular frequency of the electric motor, and further by regulating voltage on a q-axis perpendicular to the d-axis so that the phase of an oscillating component included in current of the q-axis advances 90 degrees or more with respect to the phase of an oscillating component of identical frequency included in the rotating electric angular frequency of the electric motor.

Furthermore, according to the present invention, in the power conversion device of the electric motor driving system, the dq-axes voltage adjusting part includes d-axis voltage adjusting means and q-axis voltage adjusting means. The d-axis voltage adjusting means and the q-axis voltage adjusting means comprise any one of: proportional control; proportional control and first-order lag control; and proportional control, first-order lag control and inexact differential control.

According to the present invention, an engine generator system includes a generator, an engine for driving the generator, and a PWM signal controller for performing pulse width modulation on a three-phase voltage command signal via a carrier signal, in which the three-phase voltage command signal is in accordance with current flowing through the generator. The engine generator system further includes a power conversion device driven by a pulse width modulated gate signal, an electric motor, and a power converter for driving the electric motor, wherein the power conversion device regulates an AC voltage command so that the phase of an oscillating component included in AC current of the generator advances 90 degrees or more with respect to an oscillating component of identical frequency included in a rotating electric angular frequency of the generator.

According to the present invention, an electric motor driving system includes an electric motor and a PWM signal controller for performing pulse width modulation on a three-phase voltage command signal via a carrier signal, in which the three-phase voltage command signal is in accordance with current flowing through the electric motor. The electric motor driving system further includes a power conversion device driven by a pulse width modulated gate signal, wherein the power conversion device regulates an AC voltage command so that the phase of an oscillating component included in AC current of the electric motor advances 90 degrees or more with respect to an oscillating component of identical frequency included in a rotating electric angular frequency of the electric motor.

Advantageous Effects of Invention

An engine generator system and an electric motor driving system in accordance with the present invention are provided with d-axis voltage adjusting means in addition to q-axis voltage adjusting means. This leads to the increase of effects in suppressing oscillating components produced by voltage disturbances on the d-axis and the q-axis of a generator as well as the suppression of an increase in current of the d-axis in the engine generator system and the electric motor driving system.

Moreover, in an engine generator system and an electric motor driving system, a simple control system enables the suppression of oscillating components that occur, at a specific frequency, in a shaft between an generator and an engine as well as in a shaft between an electric motor and a rotating apparatus without detailed information on the electric motor or the mechanical system.

BRIEF DESCRIPTION OF DRAWINGS

FIG. 8 shows diagrams illustrating characteristics of voltage disturbance influenced by harmonics of a power converter (CNV).

FIG. 9 shows a diagram illustrating characteristics of voltage disturbance influenced by DC voltage fluctuations of a power converter (CNV).

DESCRIPTION OF EMBODIMENTS

Figure 1:
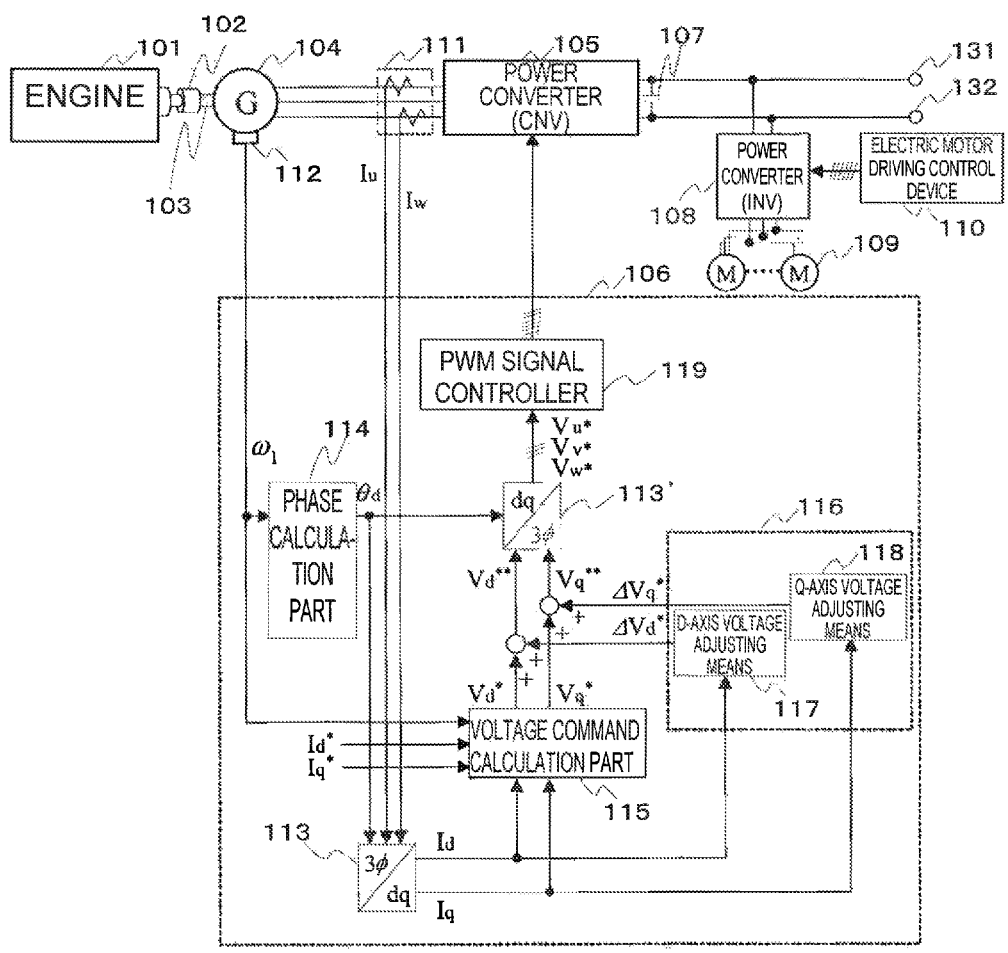
FIG. 1 is a block diagram showing an entire control configuration according to an embodiment 1 of the present invention.

Embodiments of the present invention will now be described in detail with reference to the drawings. In principle, identical elements are denoted with the same reference numerals in all the drawings.

Embodiment 1

FIG. 1 is a block diagram of an engine generator system according to an embodiment 1 of the present invention. The present system includes a generator 104 that is a controlled object; an engine 101 connected to the generator 104; a power converter (CNV) 105 that controls the generator 104; a controlling device 106 that controls the power converter (CNV) 105; an electric motor 109; a power converter (INV) 108 that drives the electric motor 109; and an electric motor driving control device 110 that controls the (INV) power converter 108.

The controlling device 106 includes a dq-axes voltage adjusting part 116 for suppressing the oscillation of a shaft 103 and a coupling section 102, provided between the engine 101 and the generator 104, which is attributed to a disturbance during power generation control. The dq-axes voltage adjusting part 116 attenuates oscillating components by controlling the power converter (CNV) 105 so that with respect to the phase of an oscillating component included in a rotating electric angular frequency of the generator 104, the phase of an oscillating component of identical frequency included in current flowing through the generator 104 advances by 90 degrees or more.

The block diagram of FIG. 1 will be described further in detail. In FIG. 1, the controlling device 106 controls the power converter (CNV) 105 based on AC current detection values Iu, Iw detected by a phase current detector 111 and a rotating electric angular frequency ω1 of the generator 104 detected by a rotation speed detector 112. Although the phase current detector 111 of FIG. 1 is configured to detect AC current by two-phase detection, three-phase detection may be used. In addition, AC current values estimated from a current value flowing through a DC resistance installed for overcurrent protection of the power converter (CNV) 105 may be used instead of a phase current sensor.

According to an electrical phase angle θd, a dq coordinate converter 113 converts AC current detection values Iu, Iw into a current detection value Id on a d-axis (magnetic flux axis) and a current detection value Iq on a q-axis (torque axis) perpendicular to the d-axis. The rotating electric angular frequency ω1 is taken by a phase calculation part 114 that computes the electrical phase angle θd. A voltage command calculation part 115 takes an exciting current command Id*, a torque current command Iq*, the rotating electric angular frequency φ1, the d-axis current detection value Id and the q-axis current detection value Iq to output a d-axis voltage command Vd* and a q-axis voltage command Vq*.

In some cases, the voltage command calculation part 115 uses torque commands or the like as well as current commands. The dq-axes voltage adjusting part 116 is composed of d-axis voltage adjusting means 117 and q-axis voltage adjusting means 118. The d-axis voltage adjusting means 117 takes the d-axis current detection value Id to output a d-axis voltage adjusting value ΔVd*. The outputted d-axis voltage adjusting value ΔVd* is added to the d-axis voltage command Vd* outputted from the voltage command calculation part 115 and then outputted as a voltage command Vd**.

The q-axis voltage adjusting means 118 takes the q-axis current detection value Iq to output a q-axis voltage adjusting value ΔVq*. The outputted q-axis voltage adjusting value ΔVq* is added to the q-axis voltage command Vq* outputted from the voltage command calculation part 115 and then outputted as a voltage command Vq. According to the electrical phase angle θd, a dq coordinate inverter 113' converts the voltage command Vd and the voltage command Vq** into voltage commands Vu*, Vv*, Vw* on a three-phase AC axis. The voltage commands Vu*, Vv*, Vw* are converted by a pulse width modulation (PWM) signal controller 119 into PWM pulse signals that drive the power converter (CNV) 105.

Figure 2:
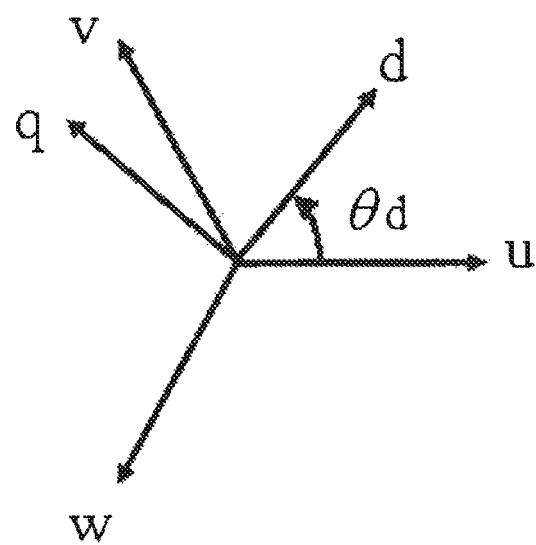
FIG. 2 shows a relationship between the axes of a three-phase stator winding and the position of a rotor magnetic flux in a generator.

According to the present embodiment, shaft oscillation suppressing means for between the engine 101 and the generator 104 will now be described. With reference to FIG. 2, coordinate axes are defined. In the present embodiment, as shown in FIG. 2, U, V, W phases of a three-phase stator winding in the generator 104 are designated as a u-axis, a v-axis, and a w-axis, respectively. The magnetic flux direction of a rotor in the generator 104 is designated as a d-axis and an axis perpendicular to the d-axis is designated as a q-axis. The electrical phase angle θd for the d-axis is defined as a phase angle viewed from the stator u-axis, as shown in FIG. 2. When θd is 0 degrees, the flux linkage of U phase winding is the largest.

The present invention uses in combination a control loop for suppressing oscillation, in which an oscillating component of the current detection value Iq on the q-axis (torque axis) is determined by an inexact differential to regulate the q-axis voltage command Vq*, and a control loop for suppressing oscillation, in which an oscillating component of the current detection value Id on the d-axis (magnetic flux axis) is determined by an inexact differential to regulate the d-axis voltage command Vd*.

This is because a q-axis voltage adjusting loop is mainly effective for suppressing shaft oscillation while a d-axis voltage adjusting loop is effective for suppressing the increase of the d-axis current value Id during use of the q-axis voltage adjusting loop. Moreover, provision of the d-axis voltage adjusting loop in addition to the q-axis voltage adjusting loop causes the phases of a d-axis current pulsation ΔId and a q-axis current pulsation ΔIq generated by voltage disturbances ΔVd, ΔVq to be in phase, making possible adjustments by an interference loop between d- and q-axes so that oscillations are not increased one another.

Figure 3:
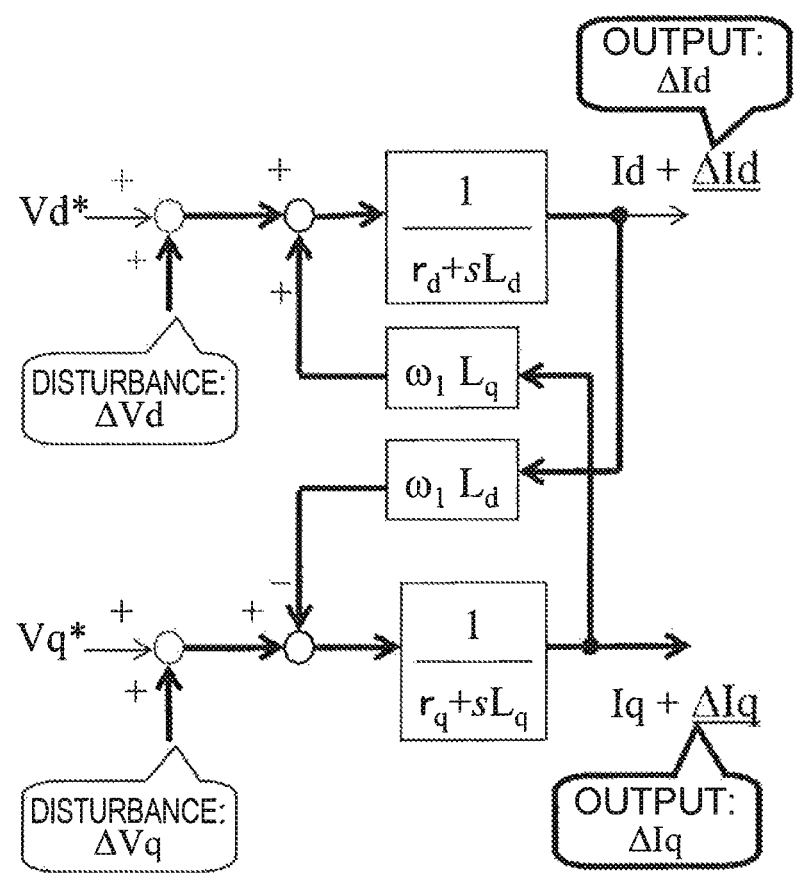
FIG. 3 is a block diagram of transmission from a voltage pulsation ΔV to a current pulsation ΔI on a d-axis and a q-axis of a permanent magnet synchronous generator when an interference loop between the d- and q-axes is taken into consideration.

FIG. 3 is a block diagram illustrating the generation of a current pulsation ΔI (a variation ΔId, a variation ΔIq) from a voltage pulsation ΔV (a disturbance ΔVd, a disturbance ΔVq) on the d-axis and the q-axis of a permanent magnet synchronous generator when an interference loop between d- and q-axes is taken into consideration.

Figure 4:
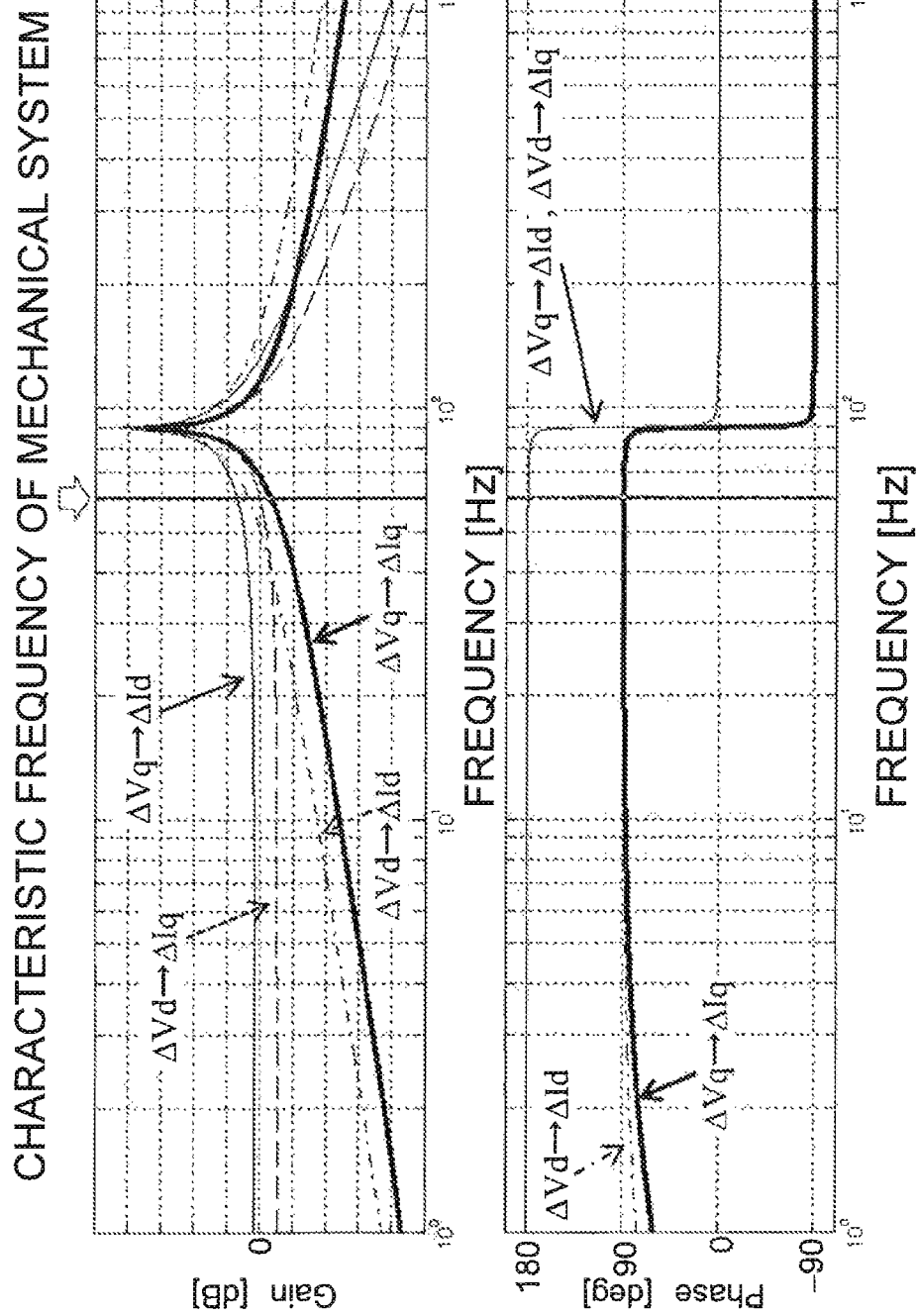
FIG. 4 shows an example of characteristics of transmission from a voltage pulsation ΔV to a current pulsation ΔI on a d-axis and a q-axis of a permanent magnet synchronous generator.

Additionally, FIG. 4 illustrates characteristics of transmission from a voltage pulsation ΔV (a disturbance ΔVd, a disturbance ΔVq) to a current pulsation ΔI (ΔId, ΔIq) on the d-axis and the q-axis of a permanent magnet synchronous generator when the permanent magnet synchronous generator is driven at an arbitrary rotational frequency. Depending on the electrical characteristics of the permanent magnet synchronous generator, the term of the square of a differential operator s is dominant over the term of the first power of the differential operator s in a transfer function with an interference loop between d- and q-axes taken into consideration. Thus, the permanent magnet synchronous generator shows resonance characteristics at a rotational frequency as shown in FIG. 4. Oscillation is enhanced when the resonance frequency approaches to a characteristic frequency of the mechanical system in an engine generator system. This poses problems.

Figure 5:
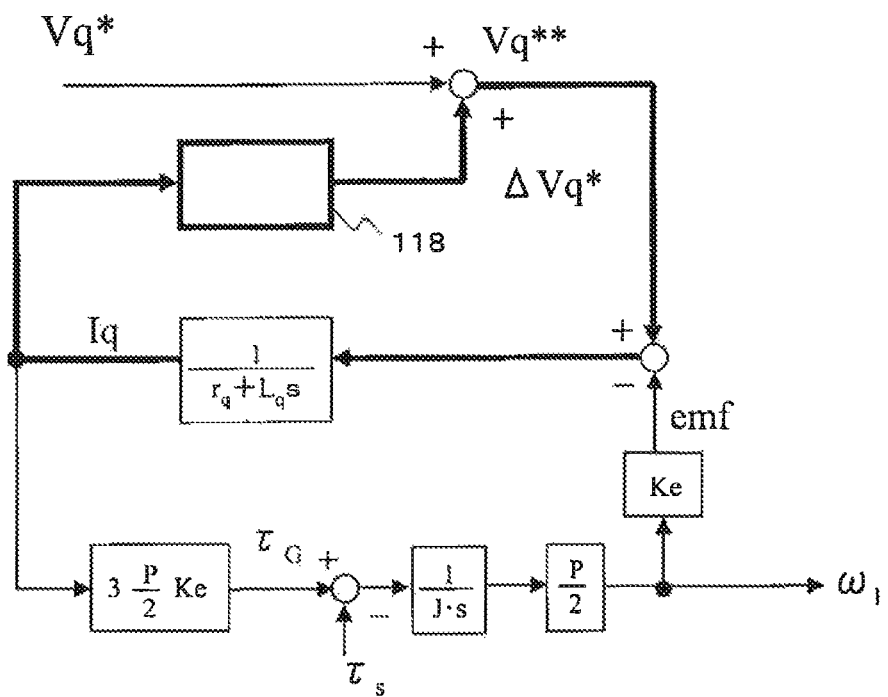
FIG. 5 is a functional block diagram including q-axis voltage adjusting means according to an embodiment 1 of the present invention.

FIG. 5 is a functional block diagram including q-axis voltage adjusting means 118 according to the embodiment 1 of the present invention. The q-axis voltage adjusting means 118 sets a voltage command adjusting value ΔVq* so that an oscillating component included in the q-axis current detection value Iq advances by 90 degrees or more with respect to an oscillating component included in the rotating angular frequency φ1 of the generator 104. Advances by 90 degrees or more allow the suppression of oscillations in a mechanical system.

Figure 6:
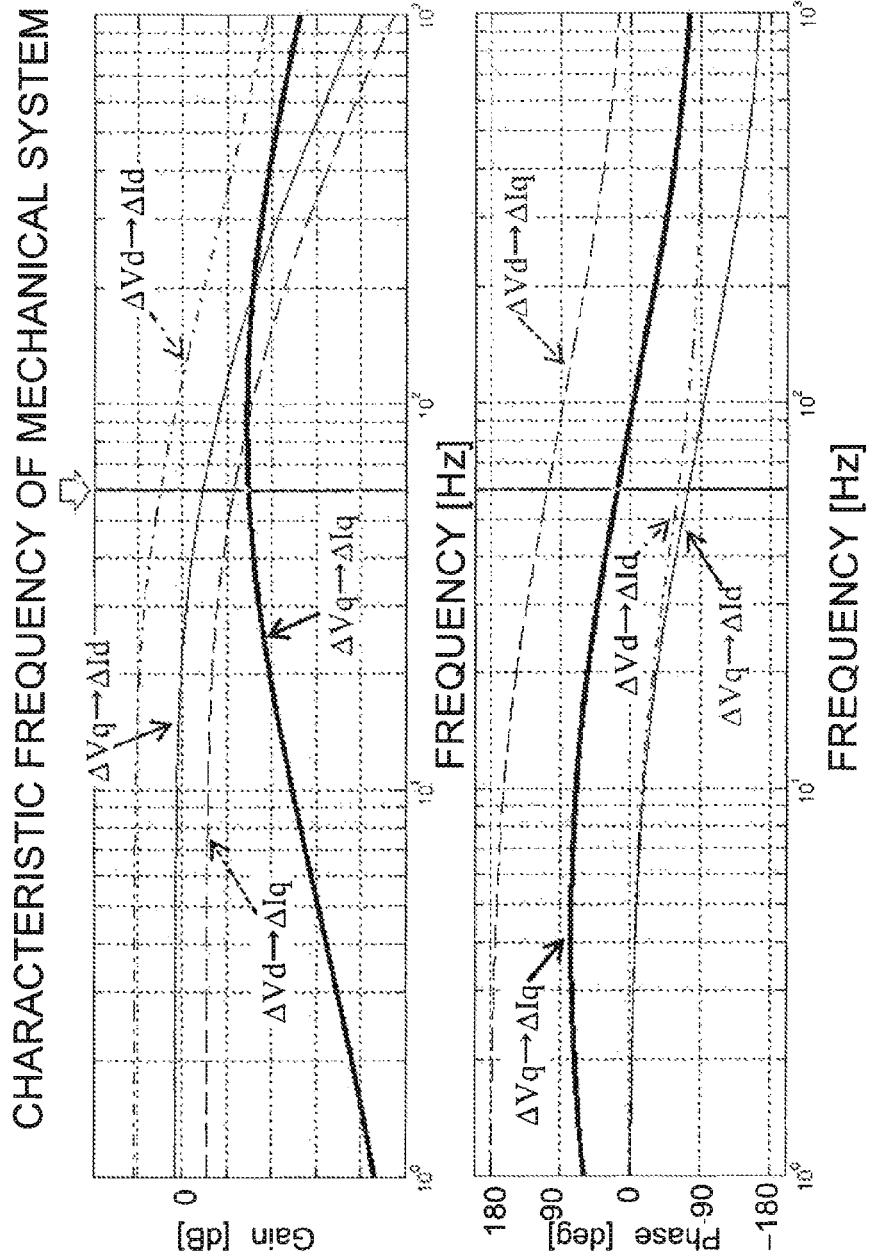
FIG. 6 shows an example of characteristics of transmission from a voltage pulsation ΔV to a current pulsation ΔI on a d-axis and a q-axis when q-axis voltage adjusting means is used.

FIG. 6 shows an example of the variation of the transfer characteristics of a current pulsation ΔI relative to a voltage disturbance ΔV when the transfer characteristics of the permanent magnet synchronous generator (FIG. 4) is provided with the q-axis voltage adjusting loop by the detection value Iq described above. It is observed that the resonance magnification of the permanent magnet synchronous generator is lowered at a rotational frequency. As a result, this allows the suppression of oscillations when the resonance frequency approaches a characteristic frequency of the mechanical system in an engine generator system.

Figure 7:
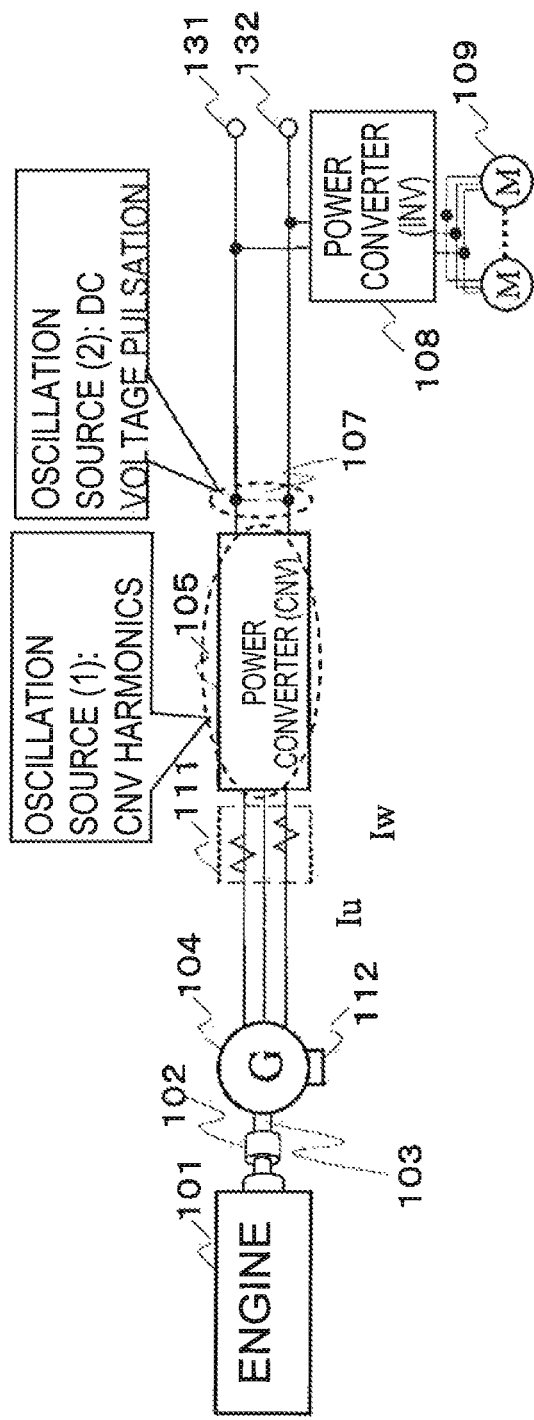
FIG. 7 is a diagram showing oscillation sources that may occur in an engine generator system.

FIG. 7 shows an example of voltage disturbances that cause shaft oscillation between an engine and a generator during power generation control in an engine generator system. Voltage disturbances postulated during power generation control in an engine generator system probably include CNV harmonics and DC voltage fluctuations.

FIG. 8 shows diagrams illustrating characteristics of voltage disturbance influenced by harmonics of the power converter (CNV) 105. With the voltage disturbances ΔVd, ΔVq used to illustrate them, one represents a combination of ΔVd as a cosine wave and ΔVq as a sine wave, and the other represents a combination of ΔVd as a cosine wave and ΔVq as an inverse sine wave. Additionally, the conditions of fundamental wave frequencies where a characteristic frequency of the mechanical system in an engine generator system coincides with the frequency of CNV harmonics are myriad because the frequency components of CNV harmonics are determined by a combination of a carrier frequency and a fundamental wave frequency.

FIG. 9 shows a diagram illustrating characteristics of voltage disturbance influenced by DC voltage fluctuations of the power converter (CNV) 105. With the voltage disturbances ΔVd, ΔVq used to illustrate them, a sine wave characteristic producing an in-phase relationship is shown. Also, voltage disturbances influenced by DC voltage fluctuations have frequency components of the second harmonic, the sixth harmonic of a drive frequency for a generator.

Accordingly, the phase relationship of characteristics of voltage disturbances that cause shaft oscillation between an engine and a generator during power generation control in an engine generator system is not uniform. For this reason, 4 characteristics of transmission from the voltage disturbance ΔV to the current pulsation ΔI, namely, "ΔVd→ΔId", "ΔVd→ΔIq", "ΔVq→ΔIq" and "ΔVq→ΔId" when an interference loop between d- and q-axes is taken into consideration exhibit a phenomenon in which the phase characteristics of voltage disturbances described above cause current pulsations to be in constructive interference (sum) or destructive interference (remainder).

Thus, in addition to lowering the characteristics of gain from the voltage pulsation ΔV to the current pulsation ΔI of a characteristic frequency in the mechanical system of an engine generator system with respect to the characteristics of voltage disturbances that cause shaft oscillation, designing a control system so as not to create conditions that strengthen a relationship between the phase difference of voltage disturbances ΔVd, ΔVq and phase characteristics in the 4 transfer characteristics "ΔVd→ΔId", "ΔVd→ΔIq", "ΔVq→ΔIq" and "ΔVq→ΔId" with a q-axis voltage adjusting loop taken into account is effective for suppressing shaft oscillation.

To solve the problem described above, the present invention provides d-axis voltage adjusting means 117 in addition to q-axis voltage adjusting means 118.

Figure 10:
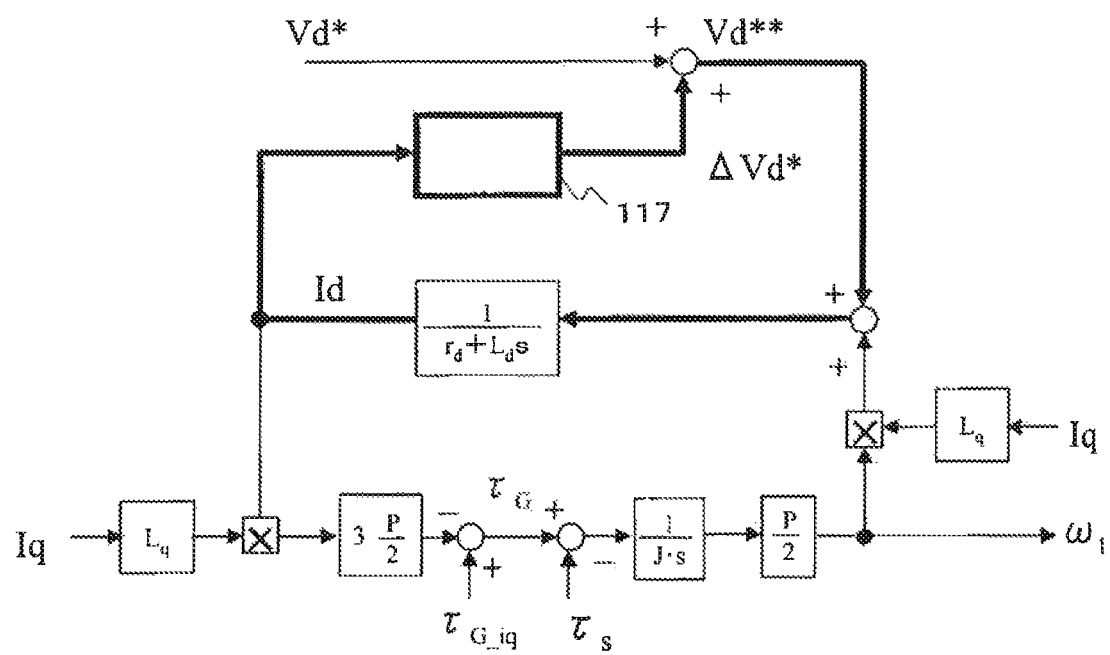
FIG. 10 is a functional block diagram including d-axis voltage adjusting means according to an embodiment 1 of the present invention.

FIG. 10 is a functional block diagram including d-axis voltage adjusting means 117 according to the embodiment 1 of the present invention. The d-axis voltage adjusting means 117 sets a d-axis voltage adjusting value ΔVd* so that an oscillating component included in the d-axis current detection value Id advances by 90 degrees or more with respect to an oscillating component included in the rotating angular frequency ω1 of the generator 104. Advances by 90 degrees or more allow the suppression of an increase in the oscillation of d-axis current. Also, in characteristics of transmission from the voltage disturbance ΔV (ΔVd, ΔVq) to the current pulsation ΔI (ΔId, ΔIq), a control design for curbing oscillation boosting conditions is made possible. As a result, higher effect in suppressing shaft oscillation is advantageously allowed over conventional art.

Figure 11:
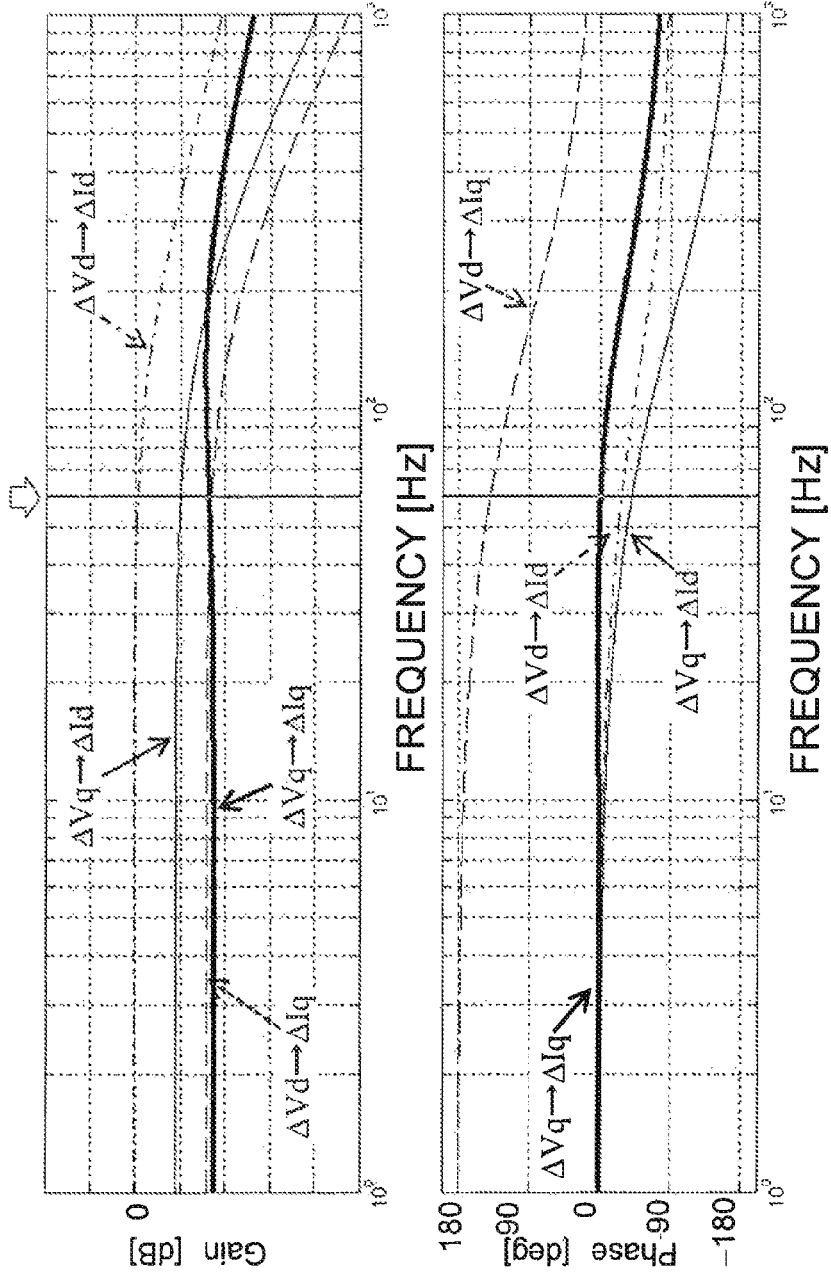
FIG. 11 shows an example of characteristics of transmission from a voltage pulsation ΔV to a current pulsation ΔI on a d-axis and a q-axis when q-axis voltage adjusting means and d-axis voltage adjusting means according to an embodiment 1 of the present invention are used in combination.

FIG. 11 shows an example of transfer characteristics of a current pulsation ΔI (ΔId, ΔIq) relative to a voltage disturbance ΔV (ΔVd, ΔVq) when the transfer characteristics of a permanent magnet synchronous generator are provided with q-axis voltage adjusting means 118 and d-axis voltage adjusting means 117.

It is understood that the gain characteristics of FIG. 11 are lowered compared to those of FIG. 6 where q-axis voltage adjusting means 118 only is provided. FIG. 11 also shows phase characteristics that enable the alleviation of a phenomenon of constructive interference (in-phase relationship) from the voltage disturbance ΔV (ΔVd, ΔVq) to the current pulsation ΔI (ΔId, ΔIq) on dq-axes with respect to the characteristics of voltage disturbances, i.e. CNV harmonics and DC voltage fluctuations during power generation control in an engine generator system.

Specific setting methods for d-axis voltage adjusting means 117 and q-axis voltage adjusting means 118 according to the present embodiment will now be described.

As described above, regulating q-axis voltage commands so that an oscillating component included in current Iq advances by 90 degrees or more with respect to an oscillating component included in the rotating angular frequency ω1 of the generator 104 enables oscillation to be reduced. In a block diagram of a system including q-axis voltage adjusting means 118 of FIG. 5, gain of the q-axis voltage adjusting means 118 is designated as $K_{qq}$.

To find gain setting for $K_{qq}$, thought is given to a loop for Iq in FIG. 5. A transfer function $G_q$ with Iq designated as a starting point is defined as the following equation (1). At this time, to give thought to oscillating components only, a loop for an induced voltage emf is ignored.

[Expression 1]

$$G_q = K_{qq} \cdot \frac{1}{r_q + L_q \cdot s} \quad (1)$$

In the equation (1), $G_q$ is denoted as a transfer function, $K_{qq}$ as a gain of q-axis voltage adjusting means 118, $r_q + L_q \cdot s$ as an impedance component of the generator 104, and s as a differential operator.

Here, an oscillation suppressing method which uses the current detection value Iq is a means which involves determining an oscillation component of Iq by an inexact differential to regulate a q-axis voltage command. In this case, with consideration given to a phase change caused by an internal impedance of the generator 104, a phase change of the inexact differential is set. For example, when a phase change by an internal impedance of the generator 104 is a phase lag by 80 degrees, control is taken so that a phase change relative to Iq advances by 90 degrees or more and less than 180 degrees by setting a time constant $T_{iq\_q}$ of an inexact differential so as to advance the phase change of the inexact differential by 0 degrees or more and less than 80 degrees, and then making the gain of a transfer loop negative and advancing the phase by 180 degrees. For example, $K_{qq}$ in FIG. 5 can be determined by the equation (2).

[Expression 2]

$$K_{qq} = \frac{K_{iqq\_1} \cdot s}{1 + T_{iq\_q} \cdot s} \cdot K_{iqq\_2} \cdot (-1) \quad (2)$$

In the equation (2), $K_{qq}$ is denoted as a gain of q-axis voltage adjusting means 118, $T_{iq\_q}$ as a time constant of an inexact differential, $K_{iqq\_1}$ and $K_{iqq\_2}$ as gains, and s as a differential operator.

Accordingly, the q-axis voltage adjusting means 118 sets $K_{qq}$ so that the phase of an oscillating component included in current Iq flowing through the generator 104 advances by 90 degrees or more with respect to the phase of an oscillating component of identical frequency included in a rotating electric angular frequency of the generator 104.

A setting method for d-axis voltage adjusting means 117 will now be described. In a block diagram of a system including d-axis voltage adjusting means 117 of FIG. 10, gain of the d-axis voltage adjusting means 117 is designated as $K_{dd}$.

To find gain setting for $K_{dd}$, thought is given to a loop for Id in FIG. 10. A transfer function $G_d$ with Id designated as a starting point is defined as the following equation (3).

[Expression 3]

$$G_d = K_{dd} \cdot \frac{1}{r_d + L_d \cdot s} \quad (3)$$

In the equation (3), $G_d$ is denoted as a transfer function, $K_{dd}$ as a gain of d-axis voltage adjusting means 118, $r_d + L_d \cdot s$ as an impedance component of the generator 104, and s as a differential operator.

Here, an oscillation suppressing method which uses the current detection value Id is likewise a means which involves determining an oscillation component of Id by an inexact differential to regulate a d-axis voltage command. In this case, with consideration given to a phase change caused by an internal impedance of the generator 104, a phase change of the inexact differential is set. For example, when a phase change by an internal impedance of the generator 104 is a phase lag by 80 degrees, control is taken so that a phase change relative to Id advances by 90 degrees or more and less than 180 degrees by setting the time constant of an inexact differential so as to advance the phase change of the inexact differential by 0 degrees or more and less than 80 degrees, and then making the gain of a transfer loop negative and advancing the phase by 180 degrees. For example, $K_{dd}$ in FIG. 10 can be determined by the equation (4).

[Expression 4]

$$K_{dd} = \frac{K_{idd\_1} \cdot s}{1 + T_{id\_d} \cdot s} \cdot K_{idd\_2} \cdot (-1) \quad (4)$$

In the equation (4), $K_{dd}$ is denoted as a gain of d-axis voltage adjusting means 117, $T_{id\_d}$ as a time constant of an inexact differential, $K_{idd\_1}$ and $K_{idd\_2}$ as gains, and s as a differential operator.

Accordingly, in like manner with the q-axis voltage adjusting means 118, the d-axis voltage adjusting means 117 sets $K_{dd}$ so that the phase of an oscillating component included in current Id flowing through the generator 104 advances by 90 degrees or more with respect to the phase of an oscillating component of identical frequency included in a rotating electric angular frequency of the generator 104.

When the proportional components of $K_{dd}$ and $K_{qq}$ of d-axis voltage adjusting means 117 and q-axis voltage adjusting means 118 are made larger, the entire system becomes unstable. Thus, when the amplitude of torque vibration of the mechanical system is greater than or equal to a predetermined value, you may regulate the proportional components of $K_{dd}$ and $K_{qq}$ so as to advance the phases 90 degrees or more. When the amplitude is smaller than the predetermined value, you may set the proportional components of $K_{dd}$ and $K_{qq}$ to a value smaller than that causes the phases to advance 90 degrees or more.

Moreover, since a relationship among phase characteristics in 4 characteristics of transmission from ΔV to ΔI ("ΔVd→ΔId", "ΔVd→ΔIq", "ΔVq→ΔIq" and "ΔVq→ΔId") with the interference loop between d- and q-axes described above changes greatly in the neighborhood of a drive frequency for the generator 104, dq-axes voltage adjusting means is required to alter settings for $K_{dd}$ and $K_{qq}$ in response to a relationship between a characteristic frequency of the mechanical system in an engine generator system and the drive frequency for the generator 104. In addition, when the electrical transfer characteristics of the generator 104 change depending on the rotating electric angular frequency or load conditions, settings for $K_{dd}$ and $K_{qq}$ need to be altered in response to the change.

When an oscillating component in the rotating angular frequency of the generator 104 and oscillating components of q-axis current and d-axis current do not present proper sinusoidal waves, observing phase differences with respect to zero points, that is, the points of intersection of the waveforms and a mean value acquired from integration of the waveforms enable you to judge whether or not the oscillatory waveforms of q-axis current and d-axis current advance 90 degrees or more relative to the oscillatory waveform of the rotating angular frequency. Also, with a distance between the peak values of the oscillatory waveform of a rotating angular frequency specified as 180 degrees, lead angles for the maximum values of the oscillatory waveforms of q-axis current and d-axis current relative to the maximum value acquired from the oscillatory waveform of the rotating angular frequency can be observed.

According to the present embodiment described above, in an engine generator system, a power converter controls the generator 104 by regulating voltage on a d-axis in the magnetic flux direction of a rotor in the generator 104 so that the phase of an oscillating component included in current of the d-axis in the generator 104 advances 90 degrees or more with respect to the phase of an oscillating component of identical frequency included in a rotating electric angular frequency of the generator 104, and further by regulating voltage on a q-axis perpendicular to the d-axis so that the phase of an oscillating component included in current of the q-axis advances 90 degrees or more with respect to the phase of an oscillating component of identical frequency included in the rotating electric angular frequency of the generator 104. This enables the increase of effects in suppressing oscillating components that occur, at a specific frequency, in a shaft between the generator 104 and the engine 101, and the suppression of an increase in current on the d-axis.

Embodiment 2

Figure 12:
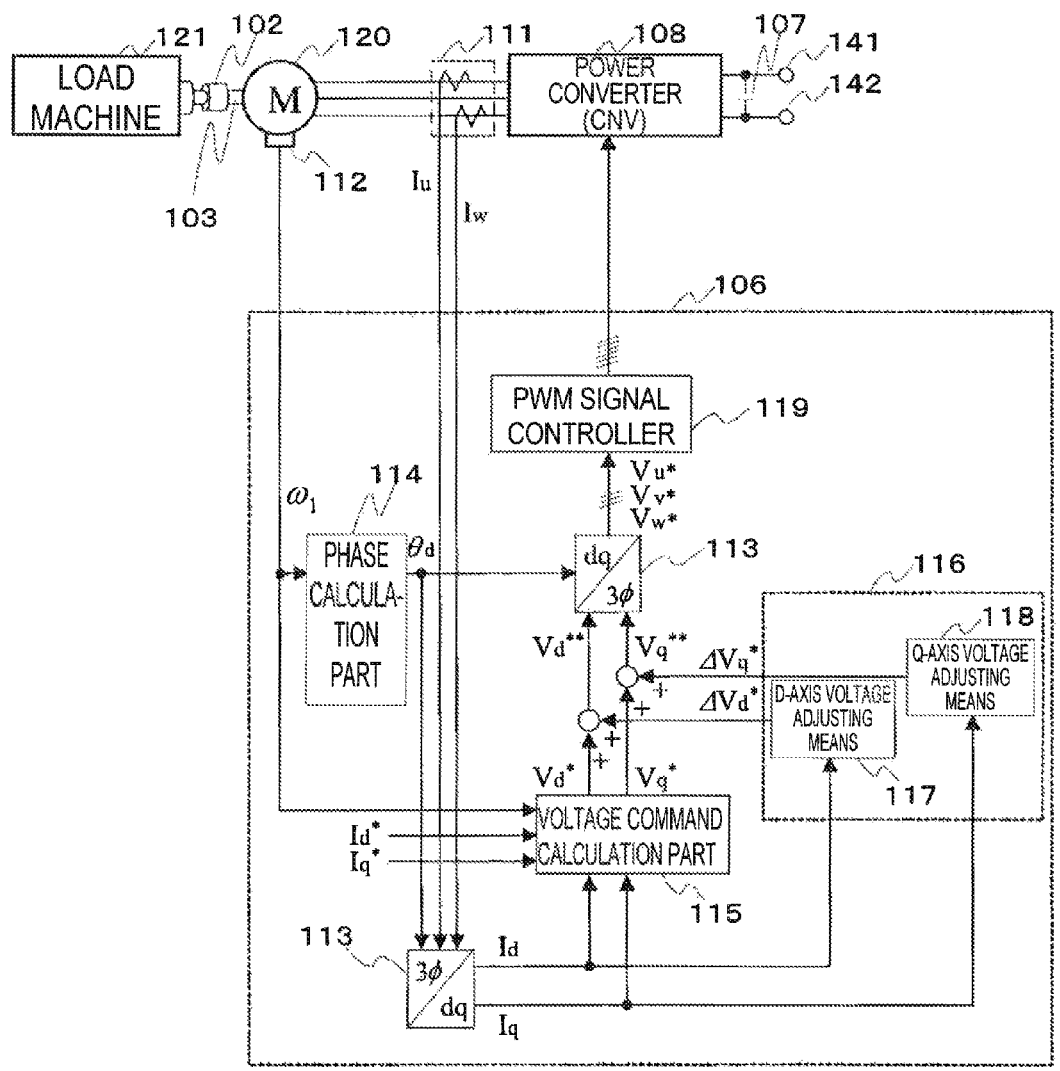
FIG. 12 is a block diagram showing an entire control configuration according to an embodiment 2 of the present invention.

An embodiment 2 of the present invention will now be described. The embodiment 2 shows an example of an electric motor driving system where a power converter drives an electric motor 120 at a variable speed to run a load machine via a torque transmission part. FIG. 12 illustrates a block diagram of an electric motor driving system according to the embodiment 2. Only differences in configuration in comparison with the embodiment 1 of FIG. 1 will be described. The present system includes an electric motor 120 that is a controlled object; a power converter (INV) 108 that controls the electric motor 120; and a controlling device 106 that controls the power converter (INV) 108.

The present embodiment makes possible the increase of effects in suppressing oscillating components that occur, at a specific frequency, in a shaft between the electric motor 120 and a load machine 121, and the suppression of an increase in current on a d-axis in the magnetic flux direction of a rotor in the electric motor 120 by regulating voltage on the d-axis so that the phase of an oscillating component included in current of the d-axis in the electric motor 120 advances 90 degrees or more with respect to the phase of an oscillating component of identical frequency included in a rotating electric angular frequency of the electric motor 120, and further by regulating voltage on a q-axis perpendicular to the d-axis so that the phase of an oscillating component included in current of the q-axis advances 90 degrees or more with respect to the phase of an oscillating component of identical frequency included in the rotating electric angular frequency of the electric motor 120.

Embodiment 3

Figure 13:
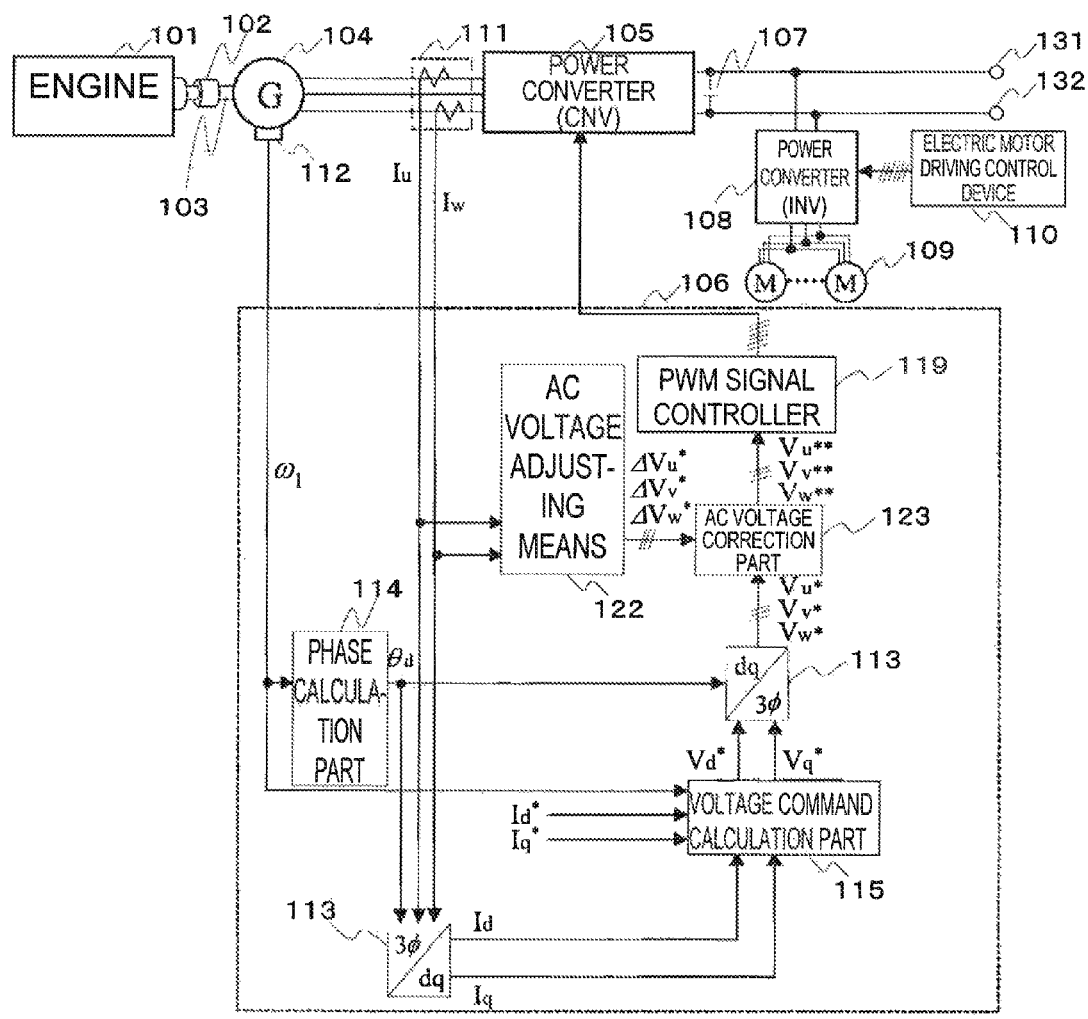
FIG. 13 is a block diagram showing an entire control configuration according to an embodiment 3 of the present invention.

An embodiment 3 of the present invention will now be described. FIG. 13 illustrates a block diagram of an engine generator system according to the embodiment 3. Only differences in configuration in comparison with the embodiment 1 of FIG. 1 will be described. In contrast to regulating dq-axes voltage commands in FIG. 1, AC voltage commands are regulated in the present embodiment.

In like manner with the embodiment 1 and the embodiment 2, AC voltage adjusting means 122 employs proportional control; proportional control and first-order lag control; proportional control and inexact differential control; proportional control, inexact differential control and first-order lag control; and the like to calculate AC voltage adjusting values of respective phases $\Delta Vu^*$, $\Delta Vv^*$, and $\Delta Vw^*$ from AC current detection values detected by a current detector 111.

In like manner with the embodiment 1 and the embodiment 2, according to the present embodiment described above, adjusting AC components so that the phase of an oscillating component in AC current advances 90 degrees or more with respect to an oscillating component in a rotating angular frequency of a generator 104 enables the oscillating components of a mechanical system to be attenuated.

Embodiment 4

Figure 14:
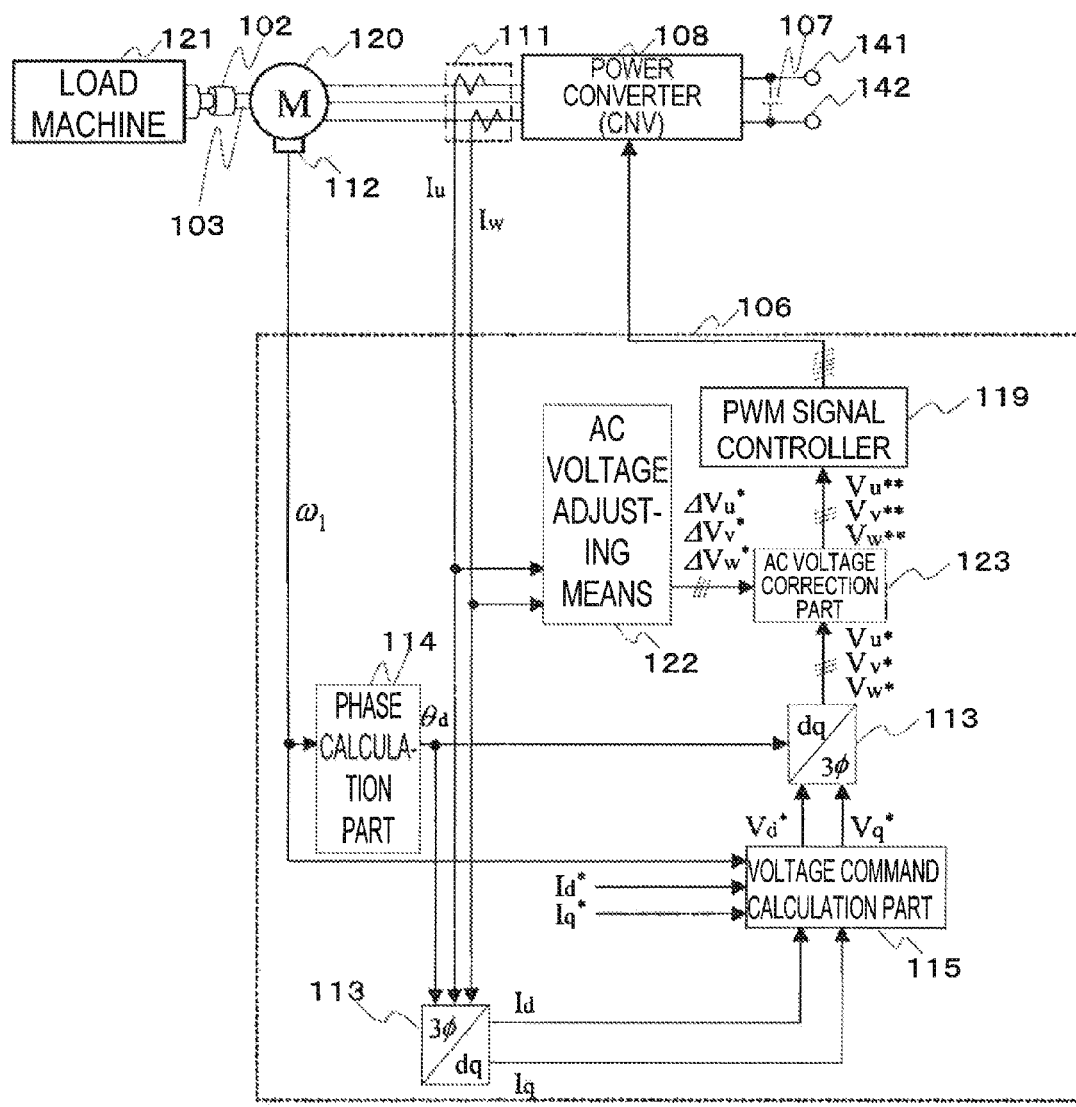
FIG. 14 is a block diagram showing an entire control configuration according to an embodiment 4 of the present invention.

An embodiment 4 of the present invention will now be described. FIG. 14 illustrates a block diagram of an electric motor driving system according to the embodiment 4. Only differences in configuration in comparison with the embodiment 2 of FIG. 12 will be described. In contrast to regulating dq-axes voltage commands in FIG. 12, AC voltage commands are regulated in the present embodiment. In like manner with the embodiment 1, the embodiment 2 and the embodiment 3, AC voltage adjusting means 122 employs proportional control; proportional control and first-order lag control; proportional control and inexact differential control; proportional control, inexact differential control and first-order lag control; and the like to calculate AC voltage adjusting values of respective phases $\Delta Vu^*$, $\Delta Vv^*$, and $\Delta Vw^*$ from AC current detection values detected by a current detector 111.

In like manner with the embodiment 1, the embodiment 2 and the embodiment 3, according to the present embodiment described above, adjusting AC components so that the phase of an oscillating component in AC current advances 90 degrees or more with respect to an oscillating component in a rotating angular frequency of an electric motor 120 enables the oscillating components of a mechanical system to be attenuated.

REFERENCE SIGNS LIST

101 engine
102 coupling section
103 shaft
104 generator
105 power converter (CNV)

106 controlling device
107 DC power supply part
108 power converter (INV)
109 electric motor
110 electric motor driving control device
111 phase current detector
112 speed detector
113 dq coordinate converter
113' dq coordinate inverter
114 phase calculation part
115 voltage command calculation part
116 dq-axes voltage adjusting part
117 d-axis voltage adjusting means
118 q-axis voltage adjusting means
119 pulse width modulation (PWM) signal controller
120 electric motor
121 load machine
122 AC voltage adjusting means
123 AC voltage correction part
131 output terminal
132 output terminal
141 input terminal
142 input terminal

The invention claimed is:

1. A power conversion device for an engine generator system,
the engine generator system comprising:
a generator;
an engine for driving the generator;
a PWM signal controller for performing pulse width modulation on a three-phase voltage command signal via a carrier signal, the three-phase voltage command signal being in accordance with current flowing through the generator;
a power conversion device driven by a pulse width modulated gate signal;
an electric motor; and
a power converter for driving the electric motor,
wherein the power conversion device regulates a voltage command on a d-axis in the magnetic flux direction of a rotor in the generator so that the phase of an oscillating component included in current of the d-axis in the generator advances 90 degrees or more with respect to the phase of an oscillating component of identical frequency included in a rotating electric angular frequency of the generator, and further regulates a voltage command on a q-axis perpendicular to the d-axis so that the phase of an oscillating component included in current of the q-axis advances 90 degrees or more with respect to the phase of an oscillating component of the identical frequency included in the rotating electric angular frequency of the generator.

2. The power conversion device according to claim 1,
wherein, in a case where the points of intersection of a mean value of a waveform representing an oscillating component in the rotating electric angular frequency and the waveform of the oscillating component are specified as zero points, and the points of intersection of a mean value of a waveform representing oscillating components of an oscillation frequency in current of the q-axis as well as current of the d-axis and the waveform of the oscillating components are specified as zero points, the power conversion device regulates a voltage command so that zero points acquired from a waveform of oscillating components in current of the q-axis and current of the d-axis advance by 90 degrees or more with respect to zero points acquired from a waveform of an oscillating component in the rotating electric angular frequency.

3. The power conversion device according to claim 2,
wherein means for regulating the voltage command comprises any one of: proportion; proportion and first-order lag; proportion and differentiation; proportion, first-order lag and inexact differentiation; proportion and inexact differentiation; and proportion, differentiation and inexact differentiation.

4. The power conversion device according to claim 1,
wherein, specifying a distance between the peak values of a waveform of an oscillating component in the rotating electric angular frequency as 180 degrees and a distance between the peak values of a waveform of oscillating components in current of the q-axis and current of the d-axis as 180 degrees, the power conversion device regulates a voltage command so that a maximum peak value of oscillating components in current of the q-axis and current of the d-axis advances by 90 degrees or more with respect to a maximum peak value acquired from a waveform of an oscillating component in the rotating electric angular frequency.

5. The power conversion device according to claim 4,
wherein means for regulating the voltage command comprises any one of: proportion; proportion and first-order lag; proportion and differentiation; proportion, first-order lag and inexact differentiation; proportion and inexact differentiation; and proportion, differentiation and inexact differentiation.

6. A power conversion device for an electric motor driving system,
the electric motor driving system comprising:
an electric motor;
a PWM signal controller for performing pulse width modulation on a three-phase voltage command signal via a carrier signal, the three-phase voltage command signal being in accordance with current flowing through the electric motor; and
a power conversion device driven by a pulse width modulated gate signal,
wherein the power conversion device regulates a voltage command on a d-axis in the magnetic flux direction of a rotor in the electric motor so that the phase of an oscillating component included in current of the d-axis in the electric motor advances 90 degrees or more with respect to the phase of an oscillating component of identical frequency included in a rotating electric angular frequency of the electric motor, and further regulates a voltage command on a q-axis perpendicular to the d-axis so that the phase of an oscillating component included in current of the q-axis advances 90 degrees or more with respect to the phase of an oscillating component of the identical frequency included in the rotating electric angular frequency of the electric motor.

* * * * *